(12) United States Patent
Ikeda

(10) Patent No.: US 10,078,799 B2
(45) Date of Patent: Sep. 18, 2018

(54) IMAGE FORMING APPARATUS, INFORMATION PROCESSING APPARATUS, METHOD OF CONTROLLING THE IMAGE FORMING APPARATUS AND COMPUTER READABLE MEDIUM

(71) Applicant: CANON KABUSHIKI KAISHA, Tokyo (JP)

(72) Inventor: Toru Ikeda, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/331,199

(22) Filed: Oct. 21, 2016

(65) Prior Publication Data

US 2017/0124438 A1    May 4, 2017

(30) Foreign Application Priority Data

Oct. 28, 2015 (JP) ................. 2015-212186

(51) Int. Cl.
| | | |
|---|---|---|
| *G06K 15/00* | (2006.01) | |
| *H04N 1/00* | (2006.01) | |
| *G11B 27/00* | (2006.01) | |
| *G06F 3/12* | (2006.01) | |

(52) U.S. Cl.
CPC ........ *G06K 15/4085* (2013.01); *G11B 27/005* (2013.01); *H04N 1/00015* (2013.01); *H04N 1/00037* (2013.01); *H04N 1/00074* (2013.01); *H04N 1/00129* (2013.01); *H04N 1/00408* (2013.01); *H04N 2201/0082* (2013.01); *H04N 2201/0089* (2013.01); *H04N 2201/0098* (2013.01); *H04N 2201/3267* (2013.01); *H04N 2201/3274* (2013.01); *H04N 2201/3297* (2013.01)

(58) Field of Classification Search
None
See application file for complete search history.

(56) References Cited

U.S. PATENT DOCUMENTS

| | | | |
|---|---|---|---|
| 9,087,292 B2 | 7/2015 | Ikeda | |
| 2008/0278753 A1 | 11/2008 | Oda et al. | |
| 2009/0284587 A1* | 11/2009 | Berg | B41F 33/0009 348/61 |
| 2014/0153027 A1* | 6/2014 | Nakamura | H04N 1/00663 358/1.14 |

* cited by examiner

*Primary Examiner* — Dov Popovici
(74) *Attorney, Agent, or Firm* — Fitzpatrick, Cella, Harper & Scinto

(57) ABSTRACT

Provided is an image forming apparatus capable of presenting to a user movies that show operation steps for solving a maintenance event occurring in the apparatus without increasing the number of times the user needs to perform the operation of playing the movie. A CPU is configured to play a combination of a plurality of movies as a series of movies that show operation steps for solving a maintenance event occurring in the image forming apparatus. The CPU is further configured to determine a stop point at which the series of movies that is playing stops playing, based on stop point information set for each of the combination of the plurality of movies. The CPU is further configured to stop the series of movies that is playing at the determined stop point.

8 Claims, 13 Drawing Sheets

| MAINTENANCE ID | MOVIE ID | STOP POINT FLAG |
|---|---|---|
| 001 | A1 | |
| | A2 | ON |
| | A3 | |
| | A6 | |
| 002 | A1 | |
| | A4 | ON |
| | A5 | |
| | A6 | |
| 003 | A1 | |
| | A2 | |
| | A3 | ON |
| | A4 | |
| | A5 | |
| | A6 | |
| 004 | B1 | |
| | B5 | |
| | B6 | ON |
| | B7 | |
| | B14 | |

FIG. 4A

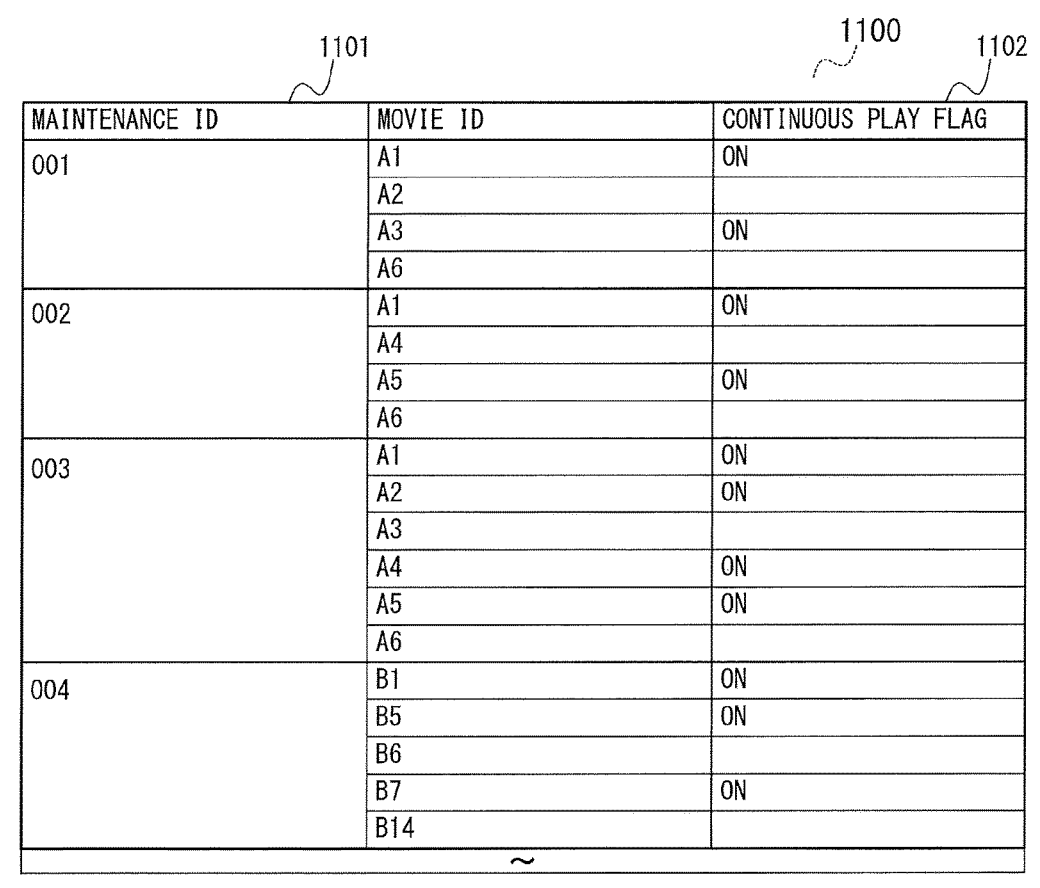

| MAINTENANCE ID | MOVIE ID | CONTINUOUS PLAY FLAG |
|---|---|---|
| 001 | A1 | ON |
|  | A2 |  |
|  | A3 | ON |
|  | A6 |  |
| 002 | A1 | ON |
|  | A4 |  |
|  | A5 | ON |
|  | A6 |  |
| 003 | A1 | ON |
|  | A2 | ON |
|  | A3 |  |
|  | A4 | ON |
|  | A5 | ON |
|  | A6 |  |
| 004 | B1 | ON |
|  | B5 | ON |
|  | B6 |  |
|  | B7 | ON |
|  | B14 |  |

FIG. 11

IMAGE FORMING APPARATUS, INFORMATION PROCESSING APPARATUS, METHOD OF CONTROLLING THE IMAGE FORMING APPARATUS AND COMPUTER READABLE MEDIUM

BACKGROUND OF THE INVENTION

Field of the Invention

The present invention relates to a technology for displaying maintenance steps of an apparatus.

Description of the Related Art

Hitherto, there has been proposed an image forming apparatus that presents steps of maintenance work such as removing a jammed sheet, replacing the toner cartridge, and replenishing staples in the form of a movie (US 2008/0278753 A1). This is for helping users to perform maintenance work more smoothly by taking advantage of the expressiveness and abundant volume of information of a movie.

Such movies showing maintenance steps of an image forming apparatus have been prepared so that each movie deals with a different maintenance work.

In the case of removing a jammed sheet, for example, a series of operation steps made up of the operation of first opening a door that is provided in the casing of the image forming apparatus in order to access the jammed place in the image forming apparatus, the operation of next removing the jammed sheet, and the operation of closing the door thereafter is prepared as one movie.

A user who is following a movie that shows maintenance steps to operate (for maintenance) the image forming apparatus often takes his/her eyes away from the movie for a moment while operating the image forming apparatus. For example, in the case of the operation of removing a jammed sheet that is stuck in a conveying portion, operating the apparatus while watching the movie is difficult. The user therefore lets the movie keep playing without watching the movie while performing the operation of removing the jammed sheet.

When the user takes long in removing the jammed sheet in this case, the movie moves ahead regardless of the user's will. A time lag is consequently created between a maintenance step that the user is to execute and a step that is being played on the movie. Another problem is that, when the user wishes to re-check the step, it is not easy to figure out how far the movie needs to be rewound for playback. A possible solution is, for example, automatically stopping (pausing) the movie between maintenance steps.

However, some states of the image forming apparatus necessitate the presentation of a plurality of maintenance steps to the user. In this case, a problem remains in that automatically stopping the movie between every two steps in an equal manner requires the trouble of performing movie playing operation again and again of the user.

The present invention has been made in view of the above, and a main object of the present invention is to provide an image forming apparatus capable of presenting to a user movies that show operation steps for solving a maintenance event occurring in the apparatus without increasing the number of times the user needs to perform the operation of playing the movie.

SUMMARY OF THE INVENTION

An image forming apparatus according to the present disclosure includes a playing unit configured to play a combination of a plurality of movies as a series of movies that show operation steps for solving a maintenance event occurring in the image forming apparatus; a determining unit configured to determine a stop point at which the series of movies that is playing stops playing, based on stop point information set for each of the combination of the plurality of movies; and a stop unit configured to stop the series of movies that is playing at the stop point determined by the determining unit.

Further features of the present invention will become apparent from the following description of exemplary embodiments (with reference to the attached drawings).

BRIEF DESCRIPTION OF THE DRAWINGS

FIG. 4A and FIG. 4B are tables for showing data configurations in which the relation between a maintenance event and a movie is defined.

FIG. 11 is a table for showing an example of a movie list table that is stored in storage according to a second embodiment of the present invention.

DESCRIPTION OF THE EMBODIMENTS

Now, embodiments of the present invention are described with reference to the accompanying drawings.

First Embodiment

Figure 1:
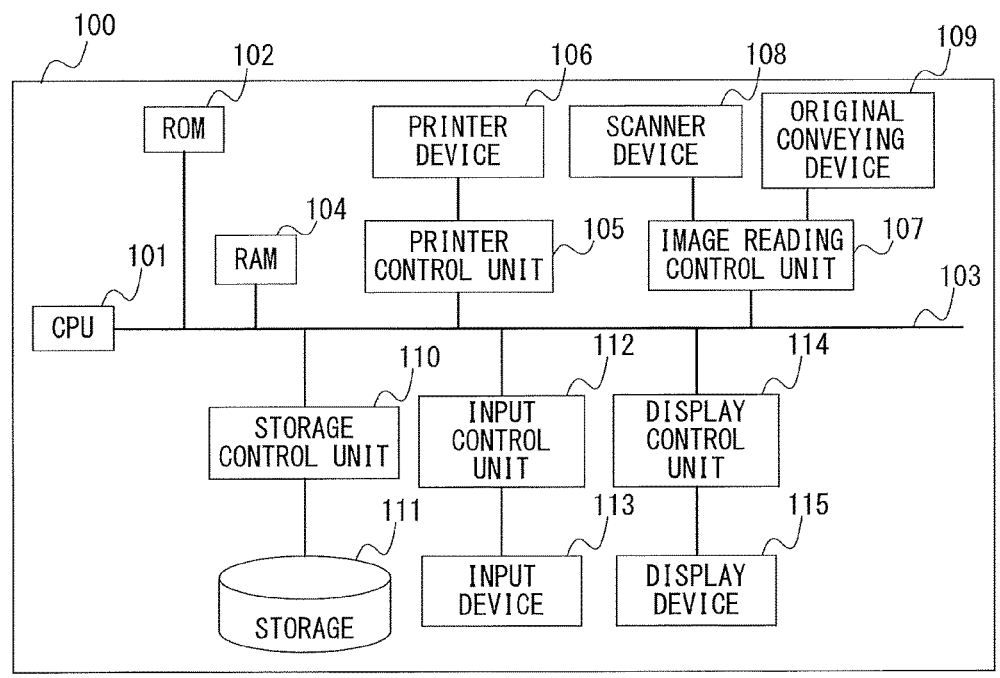
FIG. 1 is a block diagram for illustrating an example of the schematic configuration of an image forming apparatus according to a first embodiment of the present invention.

FIG. 1 is a block diagram for illustrating an example of the schematic configuration of an image forming apparatus 100 according to this embodiment.

The image forming apparatus 100 illustrated in FIG. 1 includes a central processing unit (CPU) 101, a read only memory (ROM) 102, a random access memory (RAM) 104, a printer control unit 105, an image reading control unit 107, and a storage control unit 110. The image forming apparatus 100 also includes an input control unit 112 and a display control unit 114, and the components of the image forming apparatus 100 are connected to one another via a bus 103.

The image forming apparatus 100 further includes storage 111, a printer device 106, a scanner device 108, an original conveying device 109, an input device 113, and a display device 115.

The CPU 101 is configured to control the components included in the image forming apparatus 100. The CPU 101 executes a boot program stored in the ROM 102, to thereby boot up an operating system (OS). The CPU 101 also executes various programs stored in the storage 111.

The RAM 104 is used by the CPU 101 as a main memory, a work area, and other temporary storage areas. When the CPU 101 executes a program, the program is read out of the storage 111 and stored in the RAM 104.

The printer control unit 105 is configured to control the printing of image data onto a recording medium (a sheet), for example, a sheet of paper by controlling the printer device 106. The printer device 106 is configured to print image data onto a sheet.

The image reading control unit 107 is configured to generate image data by controlling the scanner device 108. The image reading control unit 107 is also configured to generate image data by controlling the original conveying device 109, which is an auto document feeder (ADF) or the like, so that originals put on an original table of the original conveying device 109 are conveyed to the scanner device 108 one at a time. The scanner device 108 is configured to convert image information of an original into electric signal data by scanning the original with the use of a charge coupled device (CCD) or other optical reading devices.

The storage 111 is a hard disk drive (HDD) or other non-volatile storage devices in which various types of data can be read and written. This storage 111 stores a program for overall control of the image forming apparatus 100, various application programs, and various types of data including movies that show maintenance steps. The storage control unit 110 is configured to control the storage 111.

The input control unit 112 is configured to receive the user's operation instructions from the input device 113, which is a touch panel, hardware keys, or the like. The display control unit 114 is configured to control the display device 115, which is an LCD, a CRT, or the like and functions as a display unit, so that an operation screen or a movie is displayed on a display screen.

Figure 2:
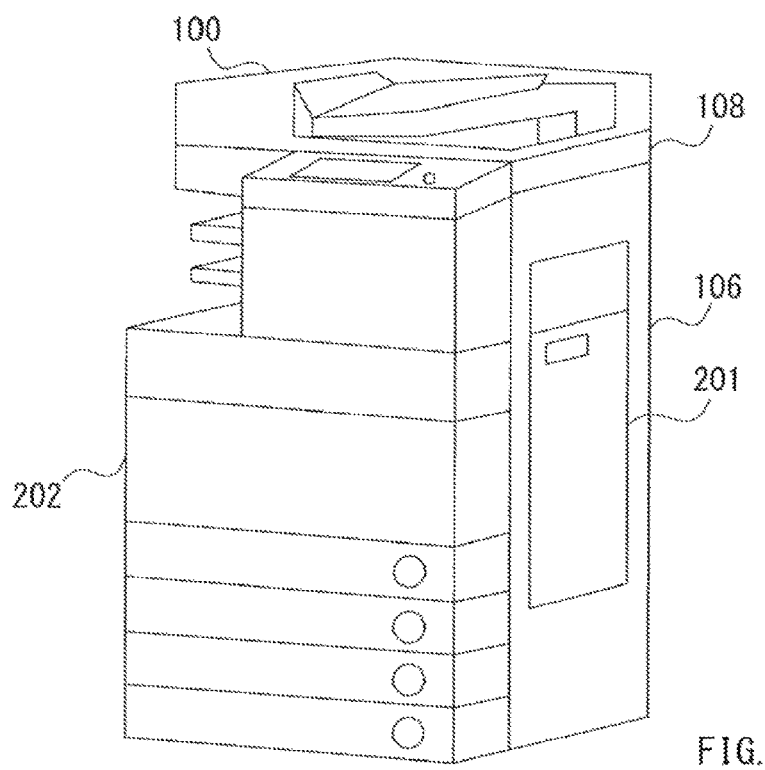
FIG. 2 is an exterior view for illustrating an example of the appearance of the image forming apparatus.

FIG. 2 is an exterior view for showing an example of the appearance of the image forming apparatus 100.

The image forming apparatus 100 includes a right cover 201 and a toner cover 202 as those illustrated in FIG. 2. The right cover 201 is a cover that is opened to expose a printing sheet conveying path when, for example, a jammed sheet is removed. The toner cover 202 is a cover that is opened to expose a toner container loading place when the toner is replaced. The image forming apparatus 100 includes a sensor (not shown) configured to detect whether the right cover 201 and the toner cover 202 are opened or closed.

Figure 3:
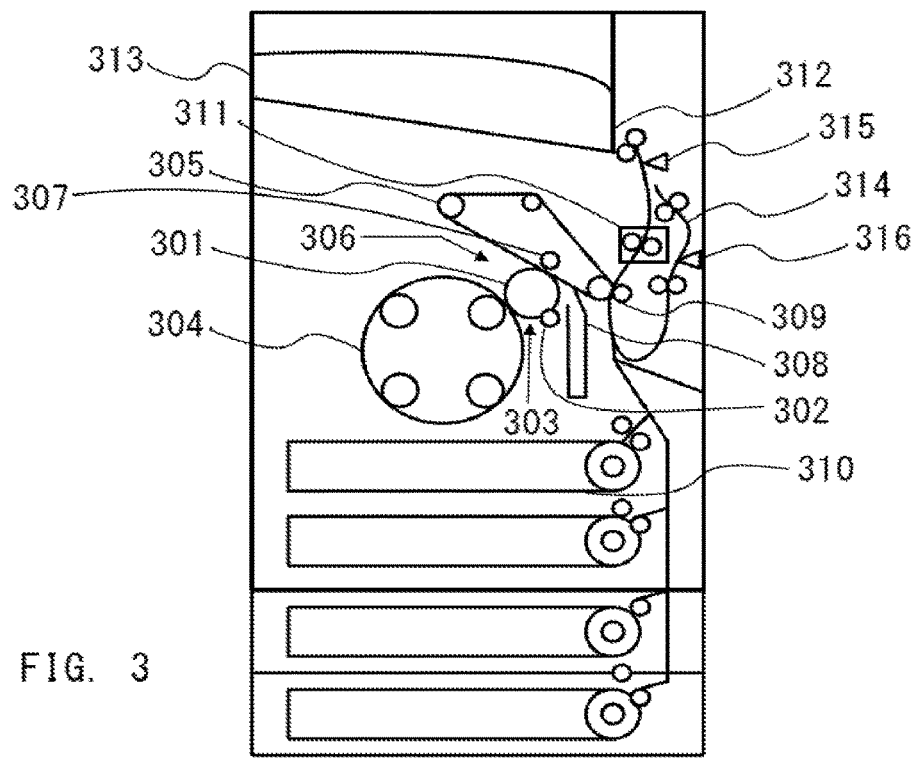
FIG. 3 is a schematic vertical sectional view for outlining the internal structure of the image forming apparatus.

FIG. 3 is a schematic vertical sectional view for outlining the internal structure of the image forming apparatus 100.

The image forming apparatus 100 is configured as, for example, an image forming apparatus that uses cyan, magenta, yellow, and black (CMYK) for full-color expression.

A primary charger 302 executes charging processing so that a photosensitive drum 301 has a particular polar potential. The photosensitive drum 301 is then exposed at a point indicated by an arrow 303 by an exposure unit (not shown) as instructed by the CPU 101. An electrostatic latent image that corresponds to the color K (black) is formed in this manner.

The rotary developer 304 includes four developers unitary with a toner cartridge. After the electrostatic latent image is formed, one of the four developers of the rotary developer 304 develops an image that corresponds to the color K (black) on the photosensitive drum 301.

An intermediate transfer belt 305 is driven in a direction indicated by an arrow 306. The image corresponding to K and developed on the photosensitive drum is transferred to the intermediate transfer belt by an electric field that a primary transfer roller 307 forms while the image is passed through a contact portion between the photosensitive drum and the intermediate transfer belt.

The surface of the photosensitive drum 301 from which the image has been transferred to the intermediate transfer belt is cleaned by a cleaning device 308. This processing is repeated sequentially until images of four colors (a magenta image, a cyan image, a yellow image, and a black image) are laid on top of one another on the intermediate transfer belt, thereby forming a color image. A unicolor image is formed by executing the transfer processing once.

The image transferred to the intermediate transfer belt 305 is printed at a secondary transfer roller 309 on a sheet fed from a cassette 310. The sheet on which the image is printed is heated by a fixer 311 to fix the image. After the fixing, the sheet is conveyed by a roller 312 to a sheet outlet 313 and ejected to the outside of the apparatus. In the case of double-sided printing, the sheet is cycled back through an inversion path 314 in order to repeat printing processing.

An ejection portion sensor 315 and a double-sided printing portion sensor 316 are configured to detect whether or not a sheet is staying in one place. A paper jam is detected with the sensors 315 and 316. The sensors 315 and 316 may be of a type that uses a mechanical flag, or a type that uses an optical element.

Figure 4A:
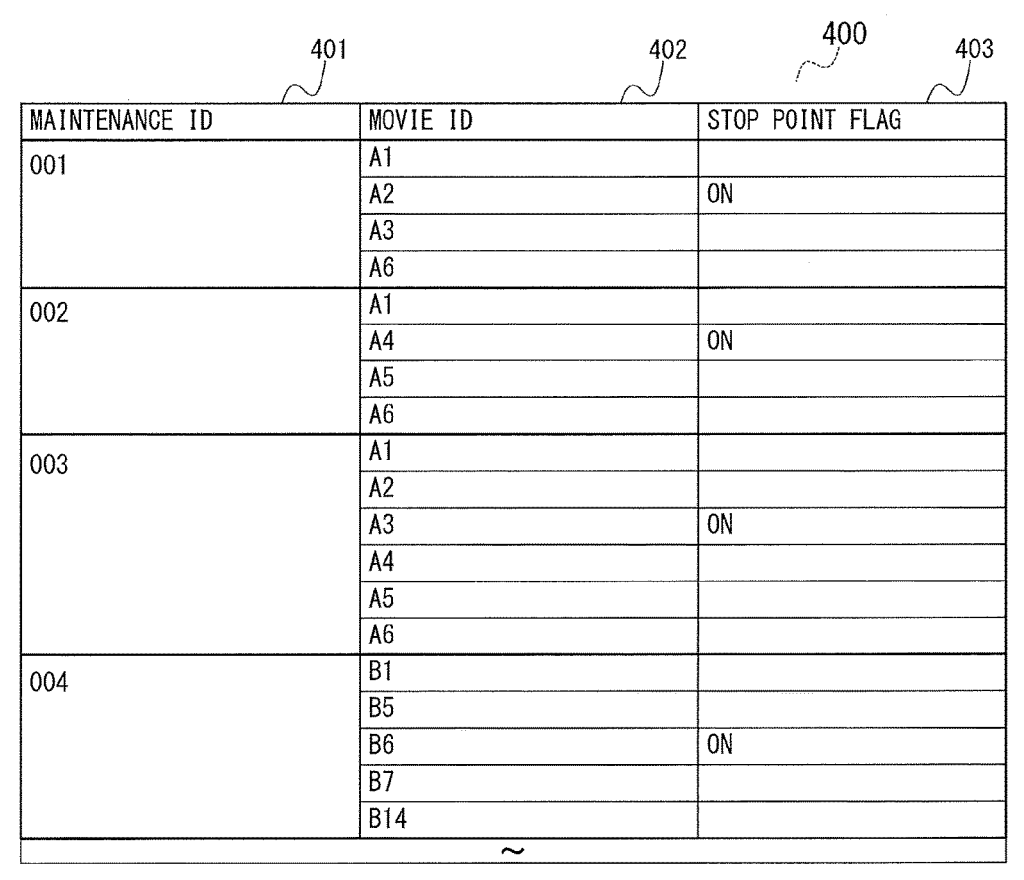
Figure 4B:
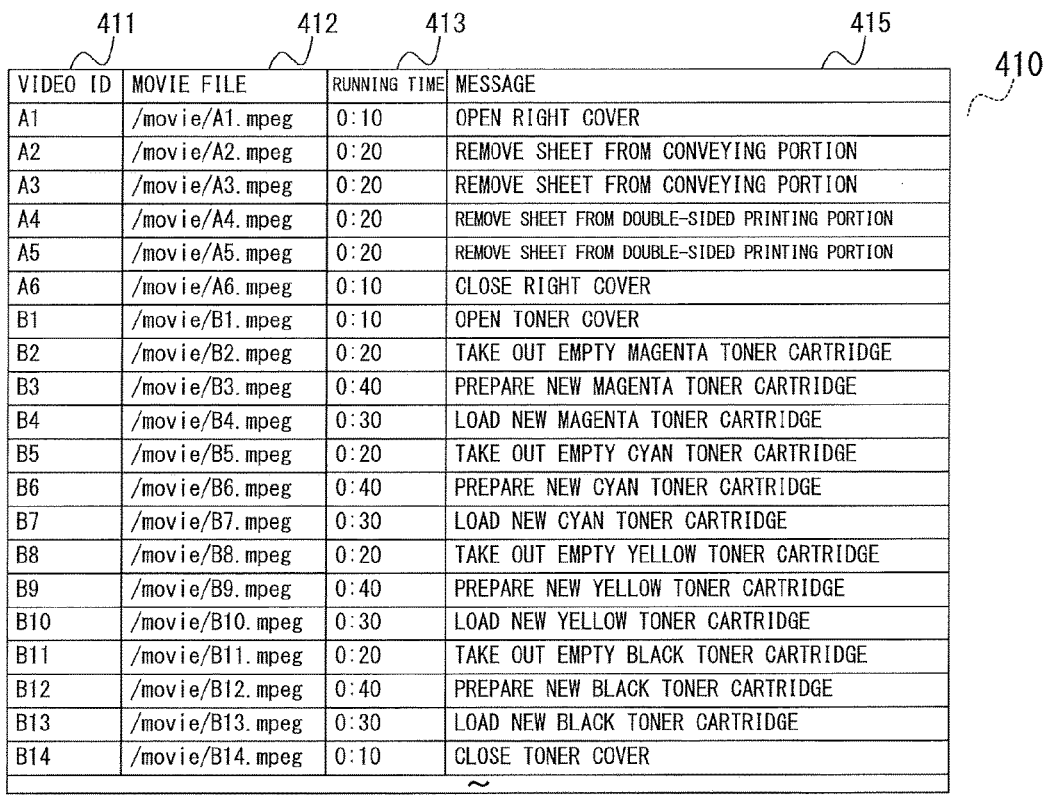

FIG. 4A and FIG. 4B are tables for showing data configurations in which the relation between a maintenance event and a movie is defined, specifically, a movie list table 400 and a movie table 410, which are stored in the storage 111.

FIG. 4A is a table for showing an example of the movie list table 400. The movie list table 400 defines the association between a maintenance event (jamming, running out of toner, or the like) and a movie to be played when the maintenance event is detected. In the movie list table 400, a maintenance ID 401, a movie ID list 402, and a stop point flag 403 are associated with one another.

The maintenance ID is identification information for identifying a maintenance event that occurs in the image forming apparatus 100. Some of maintenance IDs are shown in FIG. 4A. For example, a value "001" of the maintenance ID 401 indicates a paper jam in the conveying portion, and whether or not there is a paper jam in the conveying portion is detected by the ejection portion sensor 315. A value "002" of the maintenance ID 401 indicates a paper jam in the double-sided printing portion, and whether or not there is a paper jam in the double-sided printing portion is detected by the double-sided printing portion sensor 316. A value "003" indicates a paper jam in the conveying portion and a paper jam in the double-sided printing portion, and whether or not there are a paper jam in the conveying portion and a paper jam in the double-sided printing portion is detected by the ejection portion sensor 315 and the double-sided printing portion 316. A value "004" of the maintenance ID 401 indicates running out of cyan toner, and whether or not the cyan toner has run out is detected by the printer device 106. In this manner, a value "004" and subsequent values set as the maintenance ID 401 indicate necessary maintenance events.

As the movie ID list 402 for each maintenance event, a list of the IDs of movies to be played when the maintenance event occurs is stored. When a maintenance event occurs, a series of operation steps necessary to deal with the maintenance event needs to be presented to the user. The series of operation steps is made up of, for example, a step of opening a cover, a step of removing a jammed sheet, and a step of closing the cover, or other multiple operation steps.

In the description of this embodiment, a movie is prepared for each operation step (operation element), instead of preparing one movie that shows a series of operation steps for each maintenance event. The user is presented operation steps in the form of a series of movies that is a combination of a plurality of movies each showing one operation step. Movies each showing an operation step are referred to as "partial movies".

As the movie ID list 402, a combination of the IDs of a plurality of partial movies and information about the order in which the partial movies are played are stored for each maintenance ID 401 in association with each other.

A combination of the IDs of partial movies for the value "001" of the maintenance ID 401, for example, is partial movie IDs "A1", "A2", "A3", and "A6", which are shown on the movie ID list 402 in association with the maintenance ID "001". The order in which the partial movies are played is the order in which the partial movie IDs are written on the movie ID list 402. In the case where the maintenance ID 401 is "001", for example, the partial movies A1, A2, A3, and A6 are played in the order stated.

As the stop point flag 403, information about a stop point at which movies that are being played are automatically stopped (stop point information) is stored. In the case where the maintenance ID 401 is "001", for example, a stop point is at the tail end of the partial movie A2, which means that movie play automatically stops after the partial movies A1 and A2 are played in the order stated.

FIG. 4B is a table for showing an example of the movie table 410. In the movie table 410, a movie ID 411, a movie file 412, a running time 413, and a message 415 are associated with one another.

The movie ID 411 is an ID for identifying a partial movie, and is used also in movie ID lists in the movie list table 400 described above. The movie file 412 indicates the file name of a partial file to be played and the storage location of the partial movie file in the storage 111. The assumption of the description given here is that partial movie files are stored in the storage 111. Partial movie files may instead be stored in an external apparatus, for example, a server connected via a network or a storage device connected via a USB cable, to be read out when necessary.

The running time 413 indicates the running time of the partial movie that is identified by the movie ID 411 from the start of play to the end of play. In the following description, a point at which a partial movie starts to play and a point at which the playing of the partial movie ends may be referred to as "head" and "tail end", respectively.

The message 415 is a message displayed on the display screen while the associated partial movie is played. An operation step indicated by each partial movie file is described below.

In the partial movie A1, an operation step of opening the right cover 201 is displayed on the display screen as a message. In the partial movies A2 and A3, an operation step of removing a sheet that is jammed in the vicinity of the ejection portion sensor 315 is displayed on the display screen as a message. In the partial movies A4 and A5, an operation step of removing a sheet that is jammed in the vicinity of the double-sided printing portion sensor 316 is displayed on the display screen as a message. In the partial movie A6, an operation step of closing the right cover 201 is displayed on the display screen as a message.

In the partial movie B1, an operation step of opening the toner cover 202 is displayed on the display screen as a message. In the partial movie B2, an operation step of removing a magenta toner cartridge that is empty is displayed on the display screen as a message. In the partial movie B3, an operation step of preparing a new magenta toner cartridge is displayed on the display screen as a message. In the partial movie B4, an operation step of loading a new magenta toner cartridge is displayed on the display screen as a message. In the partial movie B5, an operation step of removing a cyan toner cartridge that is empty is displayed on the display screen as a message. In the partial movie B6, an operation step of preparing a new cyan toner cartridge is displayed on the display screen as a message. In the partial movie B7, an operation step of loading a new cyan toner cartridge is displayed on the display screen as a message.

In the partial movie B8, an operation step of removing a yellow toner cartridge that is empty is displayed on the display screen as a message. In the partial movie B9, an operation step of preparing a new yellow toner cartridge is displayed on the display screen as a message. In the partial movie B10, an operation step of loading a new yellow toner cartridge is displayed on the display screen as a message. In the partial movie B11, an operation step of removing a black toner cartridge that is empty is displayed on the display screen as a message. In the partial movie B12, an operation step of preparing a new black toner cartridge is displayed on the display screen as a message. In the partial movie B13, an operation step of loading a new black toner cartridge is displayed on the display screen as a message. In the partial movie B14, an operation step of closing the toner cover 202 is displayed on the display screen as a message.

The description returns to the movie ID list 402 of FIG. 4A. When a conveying portion jam (the maintenance ID "001") occurs, for example, the partial movie A1 showing an operation step of opening the right cover 201 is played first. Subsequently, the partial movies A2 and A3 showing an operation step of removing a sheet that is jammed in the vicinity of the ejection portion sensor 315 and the partial movie A6 showing an operation step of closing the right cover 201 are played in the order stated.

FIG. 5A to FIG. 5C, FIG. 6A to FIG. 6D, and FIG. 7A to FIG. 7G are diagrams for illustrating an example of screens that are displayed on the display screen. The transition between screens displayed on the display screen in this embodiment is described below with reference to FIG. 5A to FIG. 5C, FIG. 6A to FIG. 6D, and FIG. 7A to FIG. 7G.

Figure 5A:
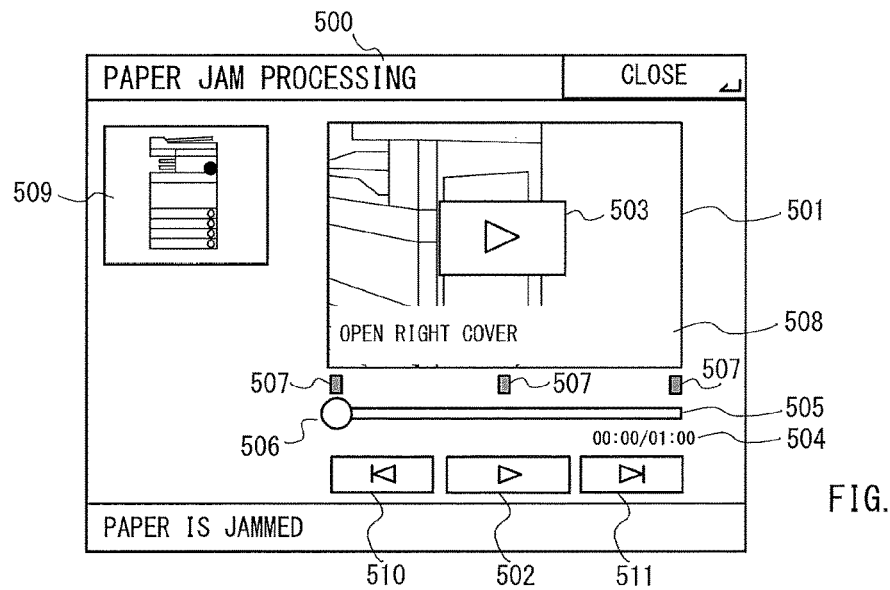
FIG. 5A, FIG. 5B, and FIG. 5C are diagrams for illustrating an example of screens that are displayed on a display screen.
Figure 5B:
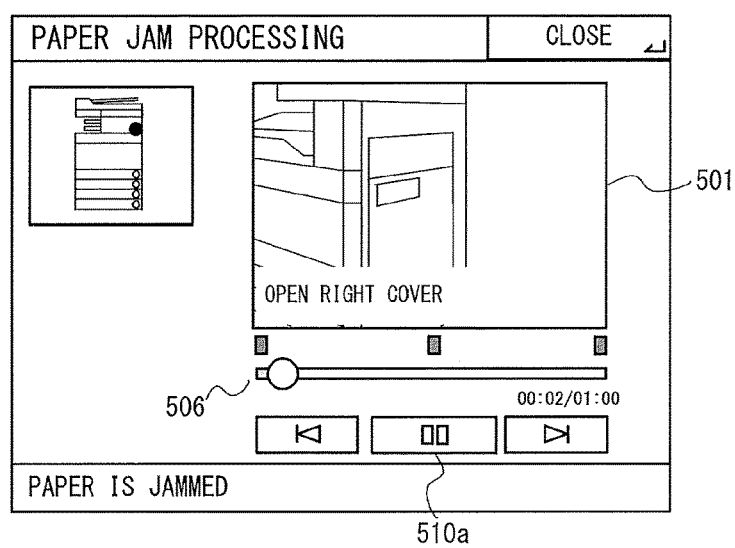
Figure 5C:
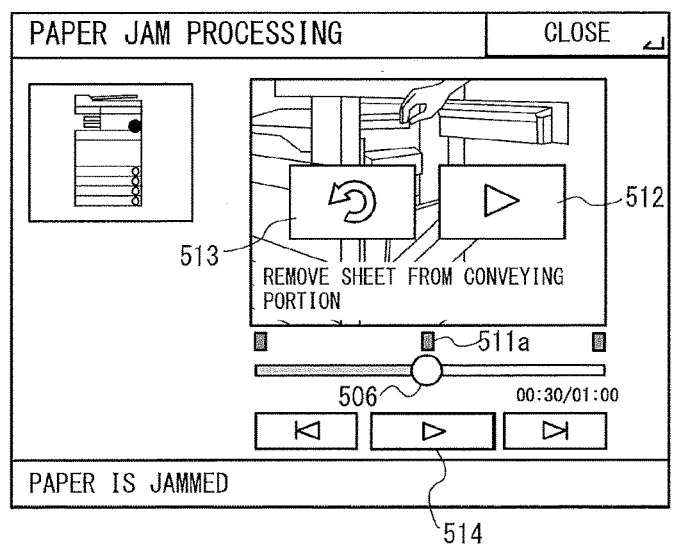

A screen 500 illustrated in FIG. 5A to FIG. 5C is displayed on the display device 115 via the display control unit 114 from display data generated by the CPU 101 executing a program that is stored in the storage 111.

A screen illustrated in FIG. 5A is an example of a screen that is displayed on the display screen first when a maintenance event is detected. The description here takes as an example a case where a conveying portion jam (the maintenance ID "001") has been detected. When the maintenance event has a maintenance ID "001", the partial movies having movie IDs "A1", "A2", "A3", and "A6" are played in order (see the movie list table 400). On the screen 500 of FIG. 5A, the head of the partial movie A1, which is a preparatory movie, namely, a scene at which movie play is started, is displayed and movie play is stopped.

The screen 500 also displays a movie display area 501, a play button 502, a play mark 503, a running time display label 504, a bar 505, a slider 506, a stop point 507, a message area 508, and an icon 509. The screen 500 further displays a stop point skip backward button 510 and a stop point skip forward button 511, which move the play point to the stop point 507.

The movie display area 501 is an area in which a movie showing a maintenance step is displayed. The play button 502 is for giving an instruction to play the movie. The play mark 503 is similar to the play button 502 in that it is used to give an instruction to play the movie. When the user presses (touches) the play button 502 or the play mark 503, the movie starts to play. The user can issue various instructions to the image forming apparatus 100 by operating by touch, buttons, marks, and other objects that are displayed on the display screen.

The running time display label 504 indicates the sum of running times of a plurality of partial movies to be displayed (referred to as "total running time"), and a length of time that corresponds to the current play point relative to the total running time.

The bar 505 and the slider 506 make up a seek bar, which indicates the play point in the combined partial movies and which is used to give an instruction to move the play point. The bar 505 schematically indicates the total running time. The slider 506 indicates the current play point and is also used to give an instruction to move the play point.

The slider 506 moves along the bar 505 with the progress of movie play. The slider 506 can be dragged (moved) to move the play point to an arbitrary point. Pressing the bar 505 at an arbitrary point forwards movie play to that point, and the slider 506 follows the move to the new play point. The stop point 507 indicates a point that breaks up movies, and movie play stops automatically after reaching the stop point 507.

A specific description is given on the running time display label 504 and the stop point 507. When the maintenance event has a maintenance ID "001", the partial movies A1, A2, A3, and A6 are played in the order stated. The running times of the partial movies A1, A2, A3, and A6 are 10 seconds (00:10), 20 seconds (00:20), 20 seconds (00:20), and 10 seconds (00:10), respectively.

The total running time, which is the sum of running times of partial movies to be played, is 1 minute and 00 seconds (01:00) in this case. The running time, on the other hand, indicates the current play point relative to the total running time. For example, in the case where a scene that is 5 seconds (00:05) past the head of the partial movie A1, which is played first, is displayed on the display screen, the running time equals the current play point and is 5 seconds.

In the case where a scene that is 10 seconds past the head of the partial movie A2, which is played second, is displayed on the display screen, the partial movie A1 has finished playing. The running time in this case is calculated as 20 seconds (00:20) by adding the running time of the partial movie A1 which is 10 seconds and the length of time of the already played portion of the partial movie A2 which is 10 seconds.

The running time display label 504 displays a letter string in which the thus calculated running time and total running time are linked to each other with a slash (/).

The stop point 507 is displayed at a breakup point in a series of operation steps. A movie that is being played is automatically stopped at the stop point 507. The stop point 507 is displayed at the tail end of a partial movie for which the stop point flag 403 is "on". When the maintenance event has a maintenance ID "001", the stop point 507 is displayed at a point that corresponds to one place in the tail end of the partial movie A2. The stop point 507 may be displayed in two more places, the head and tail end of the combined partial movies.

The stop point skip backward button 510 and the stop point skip forward button 511 are for moving the play point of a movie to the stop point 507. For example, in the case where the stop point skip forward button 511 is pressed when the running time is 00:00, the play point and the slider 506 move to the stop point 507 that is at a running time "00:30". In the case where the stop point skip backward button 510 is pressed when the running time is 01:00, the play point and the slider 506 move to the stop point 507 that is at a running time "00:30". The screen 500 of FIG. 5A displays the stop point 507 in three places on the screen.

The message area 508 displays a message that supplements images of a partial movie that is being played. Specifically, when the partial movie A1 is played, a message "open the right cover" is displayed on the display screen based on the message 415 in the movie table 410. The message in the message area 508 may cease to be displayed after a given length of time elapses since the partial movie associated with the message starts to play, or may be kept displayed for the duration of play of the associated partial movie.

The icon 509 indicates a place in the image forming apparatus 100 where the maintenance event is occurring. Specifically, in the case of a maintenance event that has a maintenance ID "001", for example, a conveying portion jam has occurred and the icon 509 that highlights the conveying portion is accordingly displayed on the display screen as illustrated in FIG. 5A.

FIG. 5B is an example of a screen that is displayed 2 seconds after the start of the playing of the partial movie A1 illustrated in FIG. 5A. The play button 502 and the play mark 503 cease to be displayed in response to the start of movie play as illustrated in FIG. 5B. A pause button 510a is displayed in place of the play button 502 in the same spot on the display screen.

FIG. 5C is an example of a screen that is displayed when the play point reaches the tail end of the partial movie A2. Movie play is automatically paused at the time the partial movie A2 finishes playing, namely, at a stop point 511a. A replay mark 513 is then displayed on the display screen along with a play mark 512. The pause button 510a ceases to be displayed and a play button 514 is displayed in the same display spot.

The replay mark 513 is a mark (object) for giving an instruction to play a currently stopped partial movie from the head of the partial movie, with the reception of a given instruction from the user as a trigger. Specifically, when the user presses the replay mark 513 while movie play is stopped at the stop point 511a, the CPU 101 resumes movie play from the head of the partial movie A1.

In this manner, the stop point 511a is placed on a work-by-work basis of maintenance operation so that movie play is automatically paused at the time a portion of the movie up through the stop point 511a finishes playing.

Moving to a movie that shows the next operation step or steps further ahead regardless of the user's will is thus prevented. In addition, the replay mark 513 is displayed along with the play mark 512 when a movie is automatically paused, which allows the user to easily choose between moving forward to the movie of the next operation step and watching the current movie again.

When the user presses the play mark 512 or the play button 514 on the screen of FIG. 5C, the partial movie A3 starts to play.

Figure 6A:
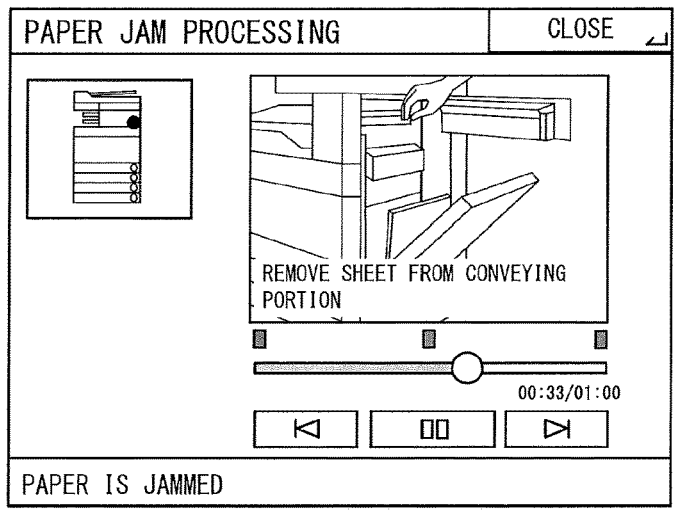
FIG. 6A, FIG. 6B, and FIG. 6C are diagrams for illustrating an example of screens that are displayed on the display screen and different from those of FIG. 5A to FIG. 5C.
Figure 6B:
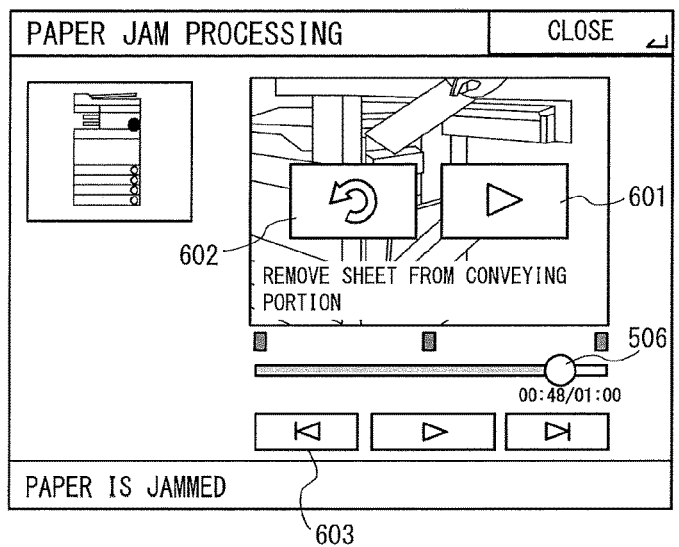

FIG. 6A is an example of a screen that is displayed 3 seconds after the start of the playing of the partial movie A3 illustrated in FIG. 5C. FIG. 6B is an example of a screen that is displayed when the user presses (touches) the pause button 510a or the movie display area 501 in the middle of the playing of the partial movie A3 illustrated in FIG. 5C. When the pause button 510a or the movie display area 501 is pressed by the user, movie play is stopped and a replay mark 601 is displayed on the display screen along with a play mark 601.

Figure 6C:
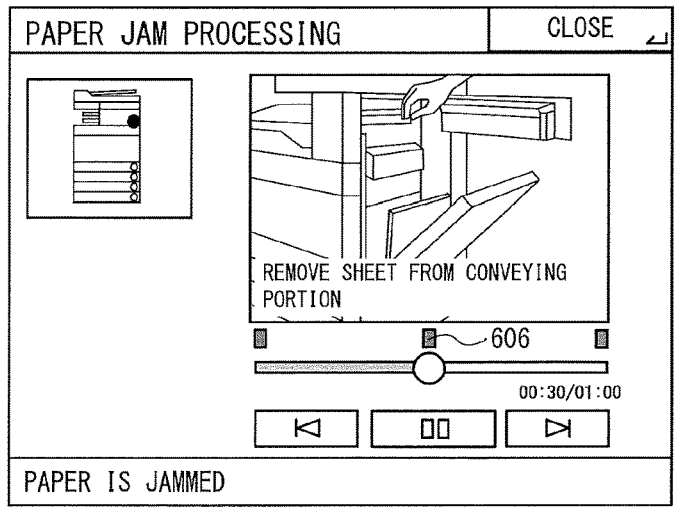

FIG. 6C is an example of a screen that is displayed when the user presses one of the replay mark 602 and a stop point skip back button 603, which are illustrated in FIG. 6B.

When the replay mark 602 or the stop point skip back button 603 is pressed by the user, movie play is resumed from a scene at the head of the partial movie A3 (a stop point 606), with the reception of the given instruction as a trigger.

In this manner, when the user intentionally operates the image forming apparatus 100 to pause a movie, a replay mark is displayed along with a play mark similarly to when movie play is automatically paused upon completion of the playing of a partial movie.

Screens illustrated in FIG. 7A to FIG. 7G are each an example in which a conveying portion jam and a double-sided printing portion jam are detected (the maintenance ID is "003") and an associated movie is being played.

When the maintenance event has a maintenance ID "003", the partial movies A1, A2, A3, A4, A5, and A6 are played in the order stated. The stop point flag 403 is on for the partial movie A3 alone, and the stop point thereof is at the tail end of the partial movie A3.

Figure 7A:
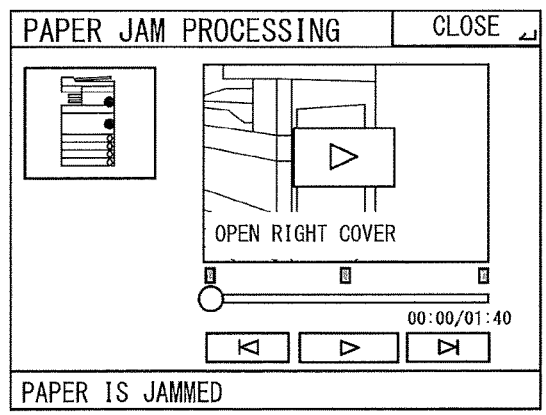
FIG. 7A to FIG. 7G are diagrams for illustrating an example of screens that are displayed on the display screen and different from those of FIG. 5A to FIG. 5C and FIG. 6A to FIG. 6C.

In the screen example of FIG. 7A, a scene at the head of the partial movie A1, namely, a scene where movie play is started is displayed on the screen and the playing of the partial movie A1 is stopped.

Figure 7B:
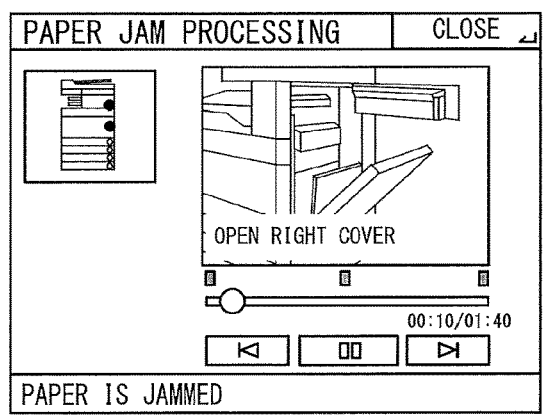

In FIG. 7B, the partial movie A1 illustrated in FIG. 7A has started to play and then a scene at the tail end of the partial movie A1, namely, a scene at the end of the playing of the partial movie A1, is displayed. The movie keeps playing at this point.

Figure 7C:
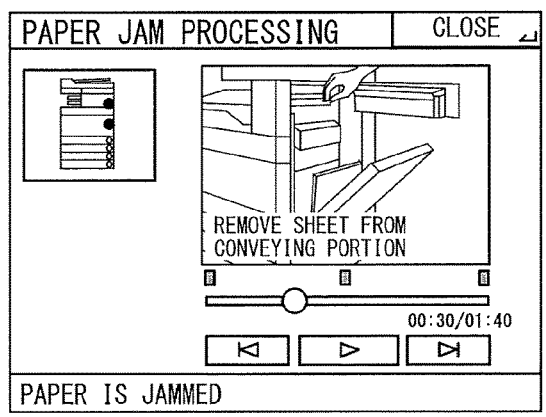

In FIG. 7C, a scene at the tail end of the partial movie A2, which is played after the partial movie A1 illustrated in FIG. 7A finishes playing, is displayed. The movie keeps playing at this point.

Figure 7D:
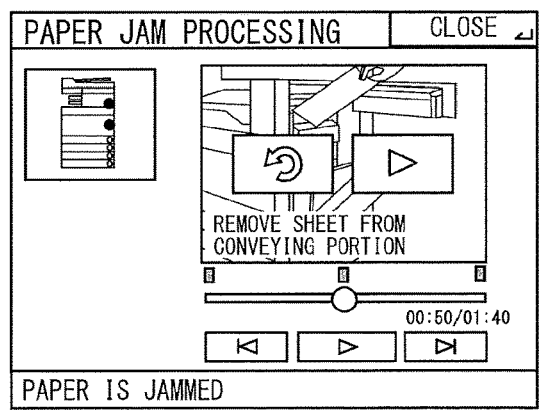

In FIG. 7D, a scene at the tail end of the partial movie A3, which is played after the partial movie A2 illustrated in FIG. 7C finishes playing, is displayed. At this point, movie play is automatically stopped at the stop point.

Figure 7E:
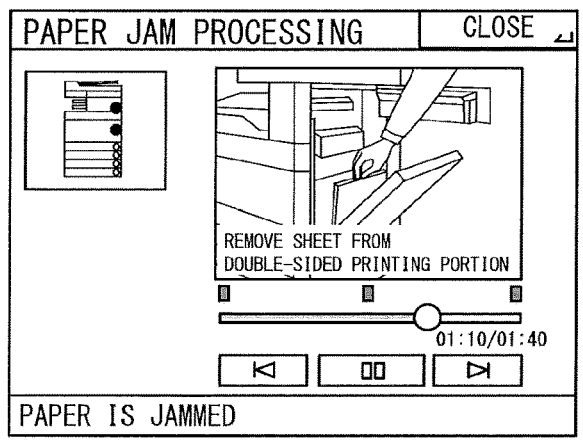

In FIG. 7E, a scene at the tail end of the partial movie A4 is displayed after movie play is resumed in FIG. 7D. The movie keeps playing at this point.

Figure 7F:
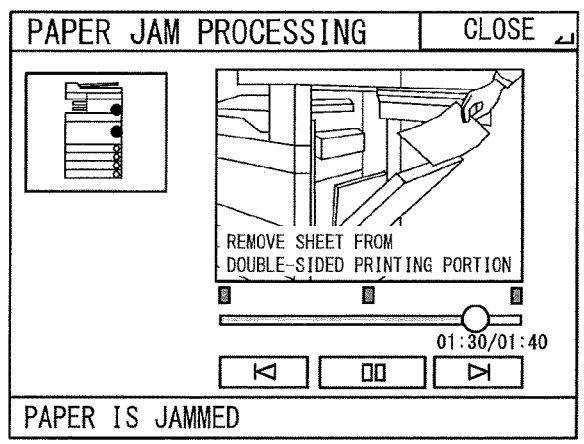

In FIG. 7F, a scene at the tail end of the partial movie A5, which is played after the partial movie A4 illustrated in FIG. 7D finishes playing, is displayed. The movie keeps playing at this point.

Figure 7G:
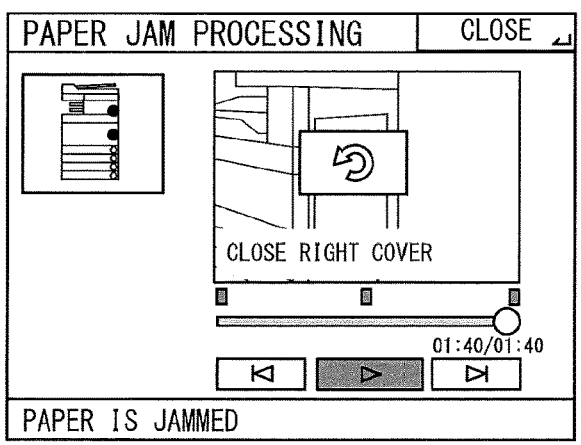

In FIG. 7G, a scene at the tail end of the partial movie A6, which is played after the partial movie A5 illustrated in FIG.

7F finishes playing, is displayed. At this point, the partial movie A6 has finished playing and movie play has automatically been stopped at the tail end of the partial movie A6. The play mark may be grayed out to indicate that movie play has ended, as illustrated in FIG. 7G.

Figure 8:
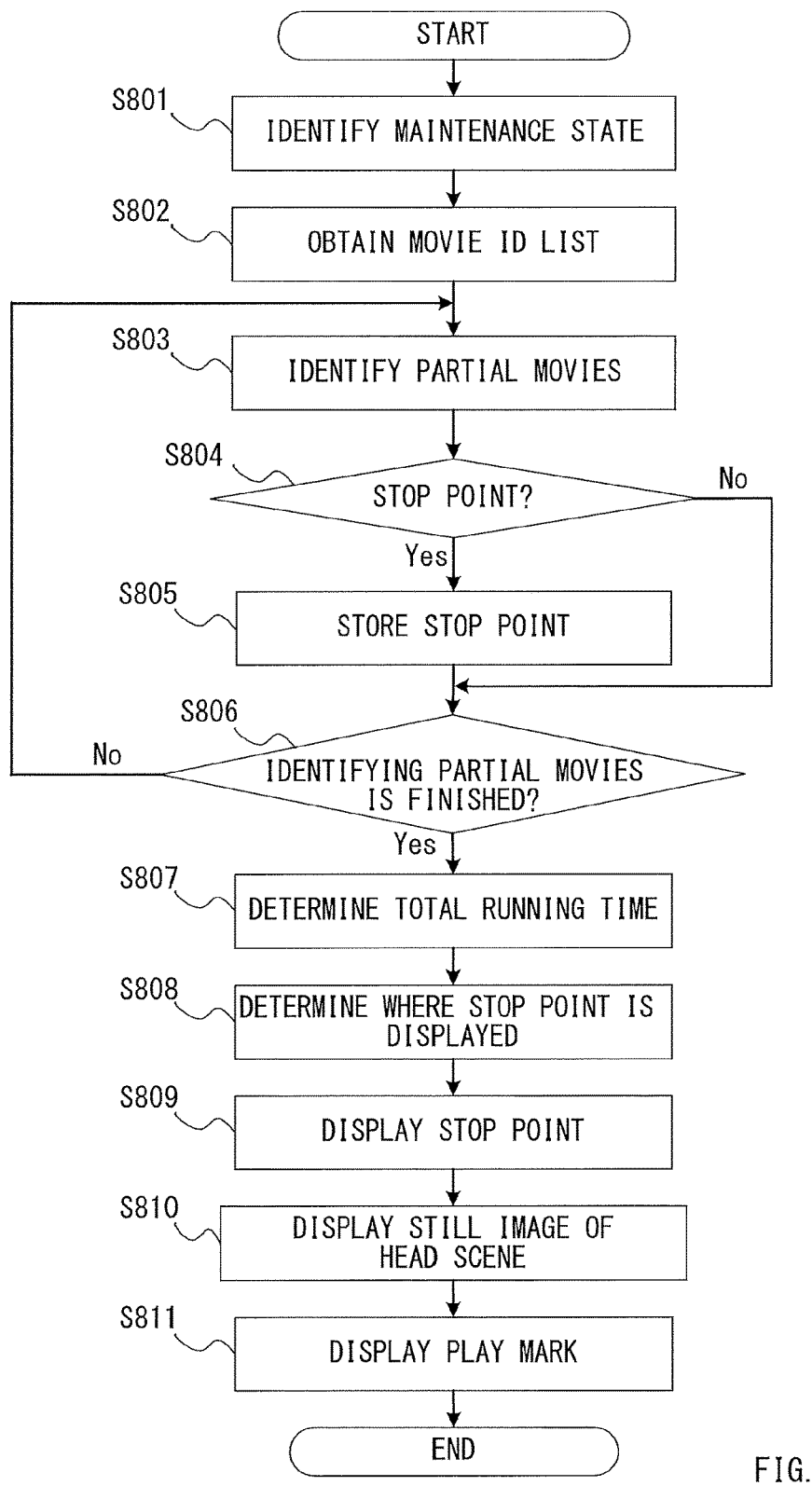
FIG. 8 is a flow chart for illustrating an example of processing steps according to maintenance operation step display by the image forming apparatus.

FIG. 8 is a flow chart for illustrating an example of processing steps that are related to maintenance operation step display of the image forming apparatus 100. Each processing step illustrated in FIG. 8 is executed mainly by the CPU 101. The start of the processing of FIG. 8 is triggered by the detection of changes in readings of the sensor that detects the opened/closed state of the right cover 201 and the toner cover 202, the ejection portion sensor 315, and the double-sided printing portion sensor 316 by the CPU 101 via the printer control unit 105.

The CPU 101 determines the type of a maintenance event that has occurred, and identifies the maintenance ID of the event based on the result of the determination (Step S801). In the case where a value that is the detection result of the ejection portion sensor 315 indicates that printing paper is stuck in the site of the sensor, for example, the CPU 101 identifies the maintenance ID as "001" (a conveying portion jam).

The CPU 101 refers to the movie list table 400 to obtain a movie ID list of partial movies that is associated with the maintenance ID identified in Step S801 (Step S802). Thereafter, partial movies that are on the movie ID list obtained in Step S802 are identified (Step S803). When the identified maintenance ID is "001", for example, the CPU 101 plays the partial movies A1, A2, A3, and A6. The CPU 101 thus functions as a playing unit configured to play a combination of partial movies as a series of movies showing operation steps for solving a maintenance event that has occurred in the image forming apparatus 100.

The CPU stores the identified partial movies and information indicating the order in which the partial movies are played in the RAM 104 as alignment information, for example.

The CPU 101 determines, for each partial movie identified in Step S803, whether or not the stop point flag 403 of the partial movie is "on", based on the movie list table 400 referred to in Step S802 (Step S804). When it is determined that the stop point flag 403 of a partial movie is on (Step S804: yes), the CPU 101 stores the tail end of the partial movie as a stop point in the RAM 104 (Step S805). In the case where the stop point flag 403 is not on (Step S804: no), the CPU 101 proceeds to Step S806. In this manner, stop points at which the playing of a series of movies is stopped are determined based on whether or not the stop point flag 403 is "on". The CPU 101 thus functions as a determining unit configured to determine stop points at which a series of movies being played stops playing, based on stop point information that is set for each partial movie separately.

The CPU 101 determines whether or not the identification of partial movies has been completed (Step S806). In the case where all relevant partial movies have been identified (Step S806: yes), the CPU 101 proceeds to Step S807. Otherwise (Step S806: no), the CPU 101 returns to Step S803.

The CPU 101 determines the total running time from the running time of each identified partial movie (Step S807). The CPU 101 displays the running time display label 504 and other relevant objects based on the determined total running time.

The CPU 101 determines where on the display screen the one or more stop points 507 are to be displayed, based on the running time of each partial movie and on the stop point flag stored in Step S805 (Step S808). The CPU 101 displays the stop point 507 at the display location determined in Step S808 (Step S809).

The CPU 101 reads onto the RAM 104 a partial movie that is identified by a head movie ID, which is the ID of a movie to be played first according to the alignment information, and outputs the head scene as a still image to the display device 115 (Step S810). For example, when the maintenance ID is "001", the CPU 101 reads the partial movie A1, which is played first, onto the RAM 104, and displays the head scene as a still image on the display screen.

The CPU 101 outputs a play mark and a play button to the display device 115 (Step S811). The play button 502 and the play mark 503 are thus displayed on the display screen as illustrated in FIG. 5A.

While the description here takes as an example a case in which the CPU 101 determines the total running time by utilizing the running time 413 of the movie table 410, and determines where the stop point is displayed, this embodiment is not limited thereto. For instance, the CPU 101 may read a plurality of partial movies associated with one another onto the RAM 104, determine the running time of each read partial movie from the frame rate and total frame count of the partial movie, and determine the total running time and chapter display locations from the determined running time. The movie format and codec in the present invention are not limited to particular ones, and various modes can be employed.

Figure 9:
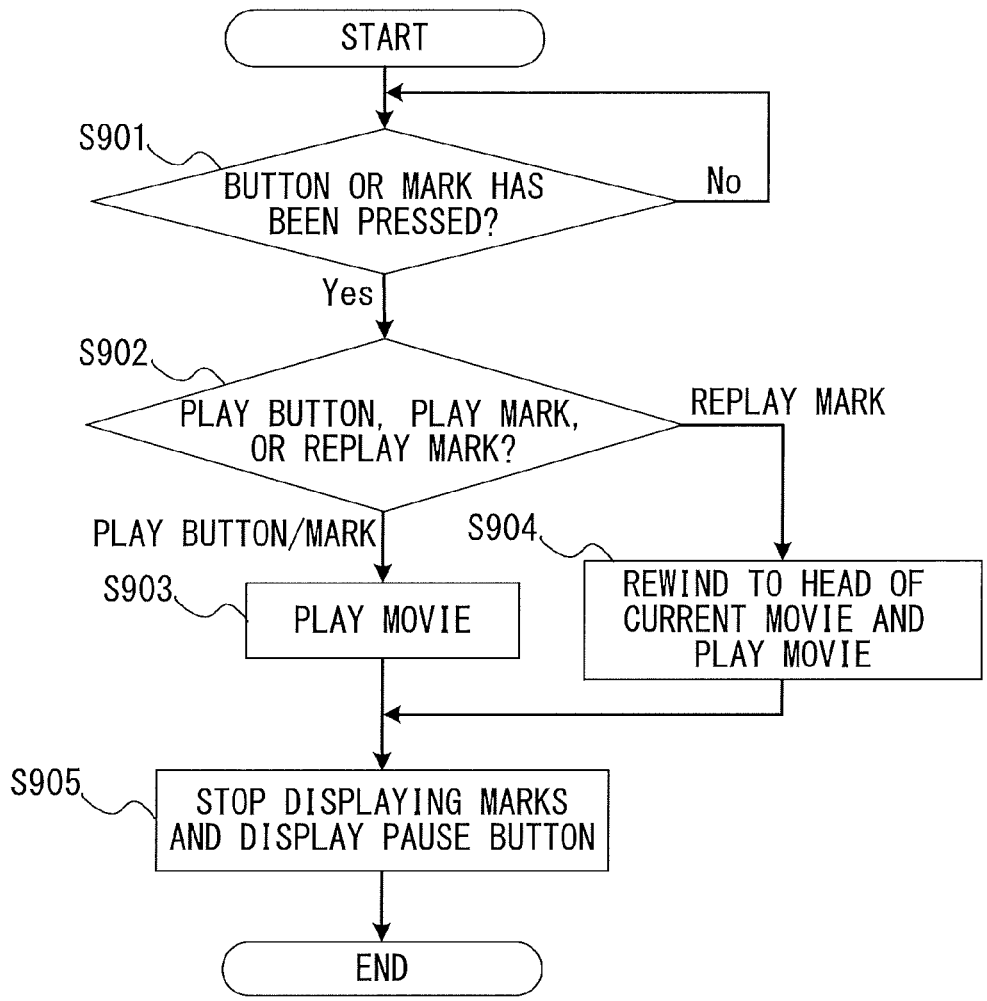
FIG. 9 is a flow chart for illustrating an example of processing steps that are executed when a movie showing maintenance steps stops playing and a user presses a play button, a play mark, or a replay mark in this state.

FIG. 9 is a flow chart for illustrating an example of processing steps that are executed when the user presses a play button, a play mark, or a replay mark while a series of movies showing maintenance steps is not playing. The processing steps illustrated in FIG. 9 are executed mainly by the CPU 101.

The CPU 101 determines whether or not the user has pressed the play button 502, the play mark, or the replay mark (Step S901). The CPU 101 determines which one of the play button 502, the play mark, and the replay mark has been pressed (Step S902). When it is determined that the play button or the play mark has been pressed, the CPU 101 determines that a given instruction has been received, and plays the movie that has been stopped (Step S903), thereby resuming movie play.

When it is determined that the replay mark has been pressed, the CPU 101 identifies a partial movie that precedes the play point at which the movie is currently stopped and that has on as the value of the stop point flag 403. The CPU 101 then plays the movie from the head of a partial movie that is played after the identified partial movie (Step S904). For example, in the case where the maintenance ID is "001" and the play point is in the partial movie A6, a partial movie that precedes the current play point and that has on as the value of the stop point flag 403 is the partial movie A2. Movie play is therefore resumed from the head of the partial movie A3 which is played after the partial movie A2.

The CPU 101 stops displaying the replay mark and the play mark, and outputs a pause button to the display device 115 (Step S905). The screen displayed in this case is as those illustrated in FIG. 5B, FIG. 6A, and FIG. 6C.

Figure 10:
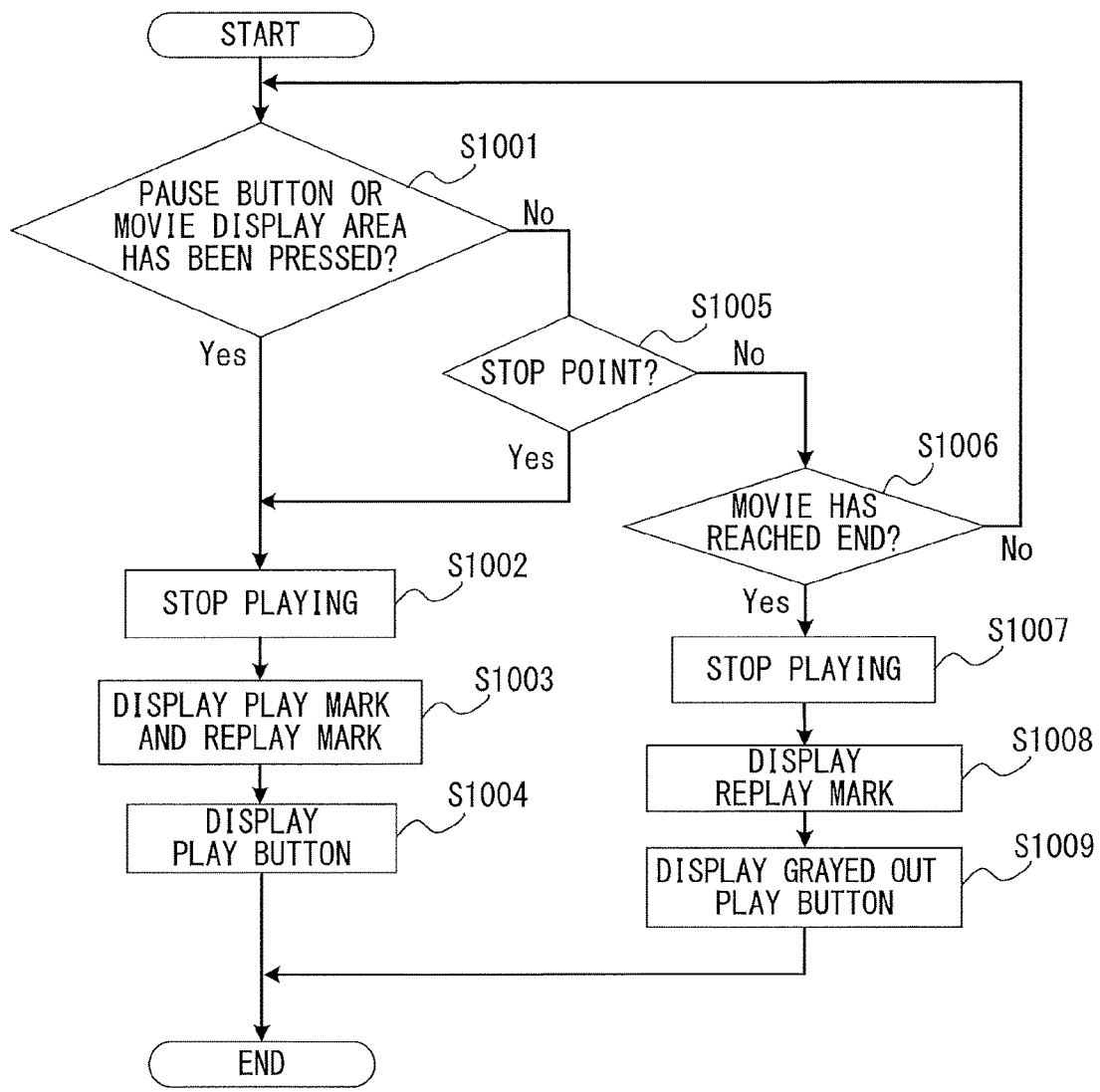
FIG. 10 is a flowchart for illustrating an example of processing steps that are executed to stop the movie showing maintenance steps from playing.

FIG. 10 is a flowchart for illustrating an example of processing steps that are executed to stop playing movies that show maintenance steps. The processing steps illustrated in FIG. 10 are executed mainly by the CPU 101.

The CPU 101 determines whether or not the user has pressed (touched) the pause button or the movie display area (Step S1001). When it is determined that the pause button or the movie display area has been pressed (Step S1001: yes), the CPU 101 stops the movie that has been playing (Step S1002). The CPU 101 thus functions as a stop unit configured to stop a series of movies that has been playing at a determined stop point.

The CPU 101 outputs the play mark and the replay mark to the display device 115 (Step S1003). The CPU 101 outputs the play button to the display device 115 (Step S1004). The screen displayed in this case is as the one illustrated in FIG. 6B, for example.

In the case where the user has not pressed the pause button or the movie display area (Step S1001: no), the CPU 101 determines whether or not the movie play point has reached the stop point (Step S1005). The stop point here is the stop point 507 set via the stop point flag 403 in Step S809 of FIG. 8, and does not include the stop points at the head and tail end of the combined movies to be played.

When it is determined that the movie play point has reached the stop point (Step S1005: yes), the CPU 101 executes Step S1002. The screen displayed in this case is as the ones illustrated in FIG. 5C and FIG. 7D, for example.

In the case where the play point has not reached the stop point (Step S1005: no), the CPU 101 determines whether or not the movie play point has reached the tail end of the movie (Step S1006). When it is determined that the tail end of the movie has been reached (Step S1006: yes), the CPU 101 stops the movie that has been playing (Step S1007). Otherwise (Step S1006: no), the CPU 101 returns to Step S1101.

The CPU 101 outputs the replay mark to the display device 115 (Step S1008).

The CPU 101 outputs a grayed out play button to the display device 115 (Step S1009). The screen displayed in this case is as the one illustrated in FIG. 7G, for example.

In this manner, the image forming apparatus according to this embodiment determines a stop point of a movie in association with a maintenance ID. This allows the user to play a movie associated with a maintenance event that is not solved yet from the head of the movie, without playing again a part that shows operation steps of already completed maintenance work. The efficiency of maintenance work is thus improved and skipping a work step by mistake can be prevented as well.

Second Embodiment

A second embodiment of the present invention is described next by focusing on differences from the first embodiment. In the first embodiment, the stop point 507 is set at the tail end of a partial movie associated with the stop point flag 403 that is on (Step S808 of FIG. 8). The description of this embodiment takes as an example a case in which the stop point is set at the tail end of a partial movie that has "off" as the value of a continuous play flag (continuous play information), and no stop point is set when the continuous play flag is "on".

Function components in this embodiment that are the same as those in the first embodiment are denoted by the same reference symbols, and descriptions thereof are omitted here.

FIG. 11 is a table for showing an example of a movie list table 1100, which is stored in storage 111 according to this embodiment. In the movie list table 1100 of FIG. 11, a continuous play flag 1102 is included as an item that replaces the stop point flag 403 of the movie list table 400 in FIG. 4A.

The continuous play flag 1102 defines a point at which one partial movie and the next partial movie are played continuously without stopping at the tail end of the preceding partial movie. For example, when the maintenance ID 1101 is "001", the continuous play flag is on for the partial movies A1 and A3, which means that the partial movies A1 and A2 are played continuously, and that the partial movies A3 and A6 are played continuously. Movie play is automatically stopped at the tail end of the partial movie A2. In this manner, information about continuously playing a currently played partial movie and a partial movie to be played next (continuous play information) is stored as the continuous play flag 1102.

Figure 12:
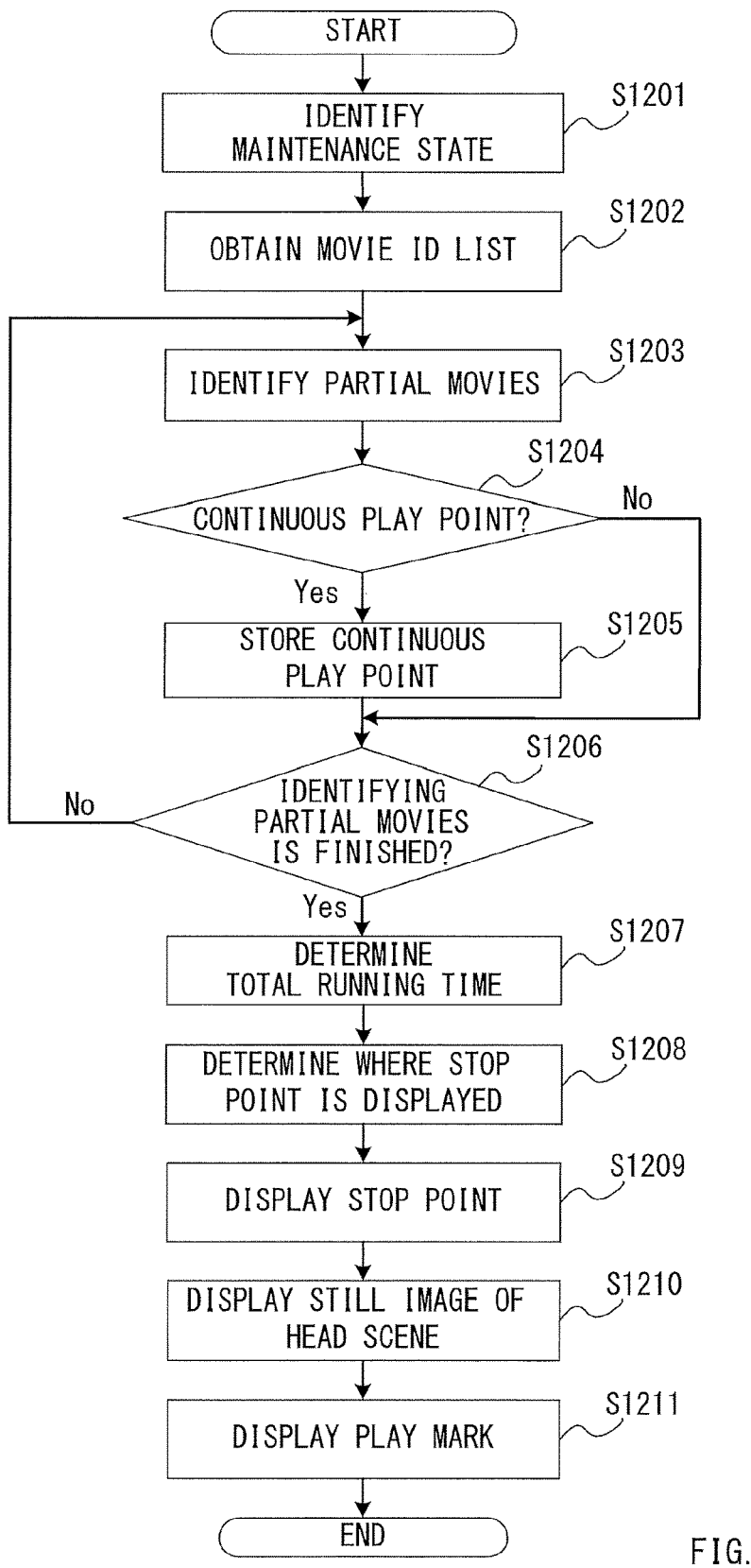
FIG. 12 is a flowchart for illustrating an example of processing steps that are executed by an image forming apparatus when a movie stops playing at the tail end of the movie and a replay mark is pressed in this state.

FIG. 12 is a flowchart for illustrating an example of processing steps that are executed in the image forming apparatus when the replay mark is pressed after movie play is stopped at the tail end of a movie.

Steps S1201 to S1203, S1206 and S1207, and S1209 to S1211 in FIG. 12 are the same as Steps S801 to S803, S806 and S807, and Steps S809 to S811 in FIG. 8, and descriptions thereof are omitted here.

The CPU 101 determines, for each partial movie identified in Step S1203, whether or not the continuous play flag 1102 is on based on the movie list table 1100 referred to in Step S1202 (Step S1204). When it is determined that the continuous play flag is on (Step S1204: yes), the CPU 101 stores in the RAM 104 information indicating that the partial movie and a partial movie to be played next are played continuously (Step S1205). Otherwise (Step S1204: no), the CPU 101 proceeds to Step S1206.

The CPU 101 determines where on the display screen the one or more stop points 507 are to be displayed, based on the running time of each partial movie and on the continuous play flag stored in Step S1205 (Step S1208). For example, when the maintenance ID 1101 is "001", the continuous play flag is on for the partial movies A1 and A3, which means that a stop point is set at the tail end of the partial movie A2, with no stop points set at the tail ends of the partial movies A1 and A3.

The CPU 101 displays the stop point 507 at the display location determined in Step S1208 (Step S1209).

According to this embodiment, whether or not one of a plurality of partial movies and another of the plurality of partial movies that is played next are to be played continuously can thus be set with case by setting the continuous play flag to "on".

While the descriptions of embodiments given above take as an example the image forming apparatus 100 that has a plurality of functions including a copy function and a scanner function, the present invention is also applicable to an image forming apparatus that has only some of the functions of the image forming apparatus 100. The present invention may also be applied to other information processing apparatus such as personal computers, PDAs, cellular phones, FAX machines, cameras, movie cameras, and other image viewers.

The present invention can be carried out also by executing processing in which software (a program) that implements the functions of the embodiments described above is supplied to a system or an apparatus via a network or various storage media, to be read and executed by a computer (or a CPU, an MPU, or the like) of the system or of the apparatus. In this case, the computer program and a storage medium in which the computer program is stored are included in the present invention.

According to the present invention, movies that show operation steps for solving a maintenance event occurring in an apparatus can thus be presented to the user without increasing the number of times the user needs to perform the operation of playing the movie.

The above-described embodiments are given just for the purpose of describing the present invention more specifically, and the scope of the present invention is not limited by the embodiments.

Other Embodiments

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-212186, filed Oct. 28, 2015 which is hereby incorporated by reference herein in its entirety.

What is claimed is:

1. An image forming apparatus, comprising:
memory which stores a plurality of movies;
a storage medium which stores computer-executable instructions; and
one or more processors configured to execute the computer-executable instructions stored in the storage medium so as to:
play a first combination of the plurality of movies stored in the memory, wherein there are plural different combinations of the plurality of movies including the first combination and a second combination, wherein each different one of the plural combinations indicates operations for resolving a maintenance event that has occurred in the image forming apparatus, and wherein each different one of the plural combinations corresponds to a maintenance event;
determine a stop point at which to stop playing the first combination of movies that is being played, wherein the first combination and the second combination both include a common predetermined movie, and wherein the first combination is set to stop at the end of the common predetermined movie, whereas the second combination is set not to stop at the end of the common predetermined movie; and stop playing the first combination of movies at the determined stop point.

2. The image forming apparatus according to claim 1, wherein the storage medium and the one or more processors are further configured to resume the stopped first combination of plural movies from a head scene of a movie, the resumption being triggered by reception of a given instruction.

3. The image forming apparatus according to claim 2, further comprising a display, wherein the display is configured to display, when the first combination of plural movies is stopped, an object that is used to give the given instruction to play the movie that has stop point information corresponding to the stop point, from the head scene of the movie.

4. The image forming apparatus according to claim 1, further comprising:

a storage which stores the plural combinations of the plurality of movies in association with each of a plurality of maintenance events;

wherein the storage medium and the one or more processors are further configured to identify a plurality of movies associated with a detection of a maintenance event based on information stored in the storage, and to play the identified plurality of movies.

5. The image forming apparatus according to claim 4, wherein the storage further stores the combination of the plurality of movies and a play order in which the plurality of movies are played, and wherein the storage medium and the one or more processors are further configured to identify a plurality of movies associated with the detection of the maintenance event, and to play the identified plurality of movies in the play order.

6. A method of controlling an image forming apparatus, comprising:

playing a first combination of a plurality of movies, wherein there are plural different combinations of the plurality of movies including the first combination and a second combination, wherein each different one of the plural combinations indicates operations for resolving a maintenance event that has occurred in the image forming apparatus, and wherein each different one of the plural combinations corresponds to a maintenance event;

determining a stop point at which to stop playing the first combination of movies that is being played, wherein the first combination and the second combination both include a common predetermined movie, and wherein the first combination is set to stop at the end of the common predetermined movie, whereas the second combination is set not to stop at the end of the common predetermined movie; and stopping playing of the first combination of movies at the determined stop point.

7. An information processing apparatus, comprising:

memory which stores a plurality of movies;

a storage medium which stores computer-executable instructions; and one or more processors configured to execute the computer-executable instructions stored in the storage medium so as to:

play a first combination of the plurality of movies stored in the memory, wherein there are plural different combinations of the plurality of movies including the first combination and a second combination, wherein each different one of the plural combinations indicates operations for resolving a maintenance event that has occurred in an image forming apparatus coupled to the information processing apparatus, and wherein each different one of the plural combinations corresponds to a maintenance event;

determine a stop point at which to stop playing the first combination of movies that is being played, wherein the first combination and the second combination both include a common predetermined movie, and wherein the first combination is set to stop at the end of the common predetermined movie, whereas the second combination is set not to stop at the end of the common predetermined movie; and stop playing the first combination of movies at the determined stop point.

8. A non-transitory computer readable medium containing program instructions for causing a computer in an information processing apparatus to perform a method comprising:

playing a first combination of a plurality of movies, wherein there are plural different combinations of the plurality of movies including the first combination and a second combination, wherein each different one of the plural combinations indicates operations for resolving a maintenance event that has occurred in an image forming apparatus coupled to the information processing apparatus, and wherein each different one of the plural combinations corresponds to a maintenance event;

determining a stop point at which to stop playing the first combination of movies that is being played, wherein the first combination and the second combination both include a common predetermined movie, and wherein the first combination is set to stop at the end of the common predetermined movie, whereas the second combination is set not to stop at the end of the common predetermined movie; and stopping playing of the first combination of movies at the determined stop point.

* * * * *